A. D'ERRICO.
RESILIENT WHEEL.
APPLICATION FILED SEPT. 18, 1919.

1,341,842.

Patented June 1, 1920.

Inventor.
Alfonso D'Errico
by Heard Smith & Tennant
Attys.

UNITED STATES PATENT OFFICE.

ALFONSO D'ERRICO, OF BOSTON, MASSACHUSETTS.

RESILIENT WHEEL.

1,341,842.  Specification of Letters Patent.  Patented June 1, 1920.

Application filed September 18, 1919. Serial No. 324,281.

*To all whom it may concern:*

Be it known that I, ALFONSO D'ERRICO, a subject of the King of Italy, residing at Boston, county of Suffolk, State of Massachusetts, have invented an Improvement in Resilient Wheels, of which the following description, in connection with the accompanying drawing, is a specification, like characters on the drawing representing like parts.

This invention relates to resilient wheels and has for its object to provide a novel wheel of this nature which is simple and inexpensive to manufacture and which has other advantages, all as will be presently pointed out.

In order to give an understanding of my invention, I have illustrated in the drawings a selected embodiment thereof which will now be described, after which the novel features will be pointed out in the appended claim.

Figure 1:
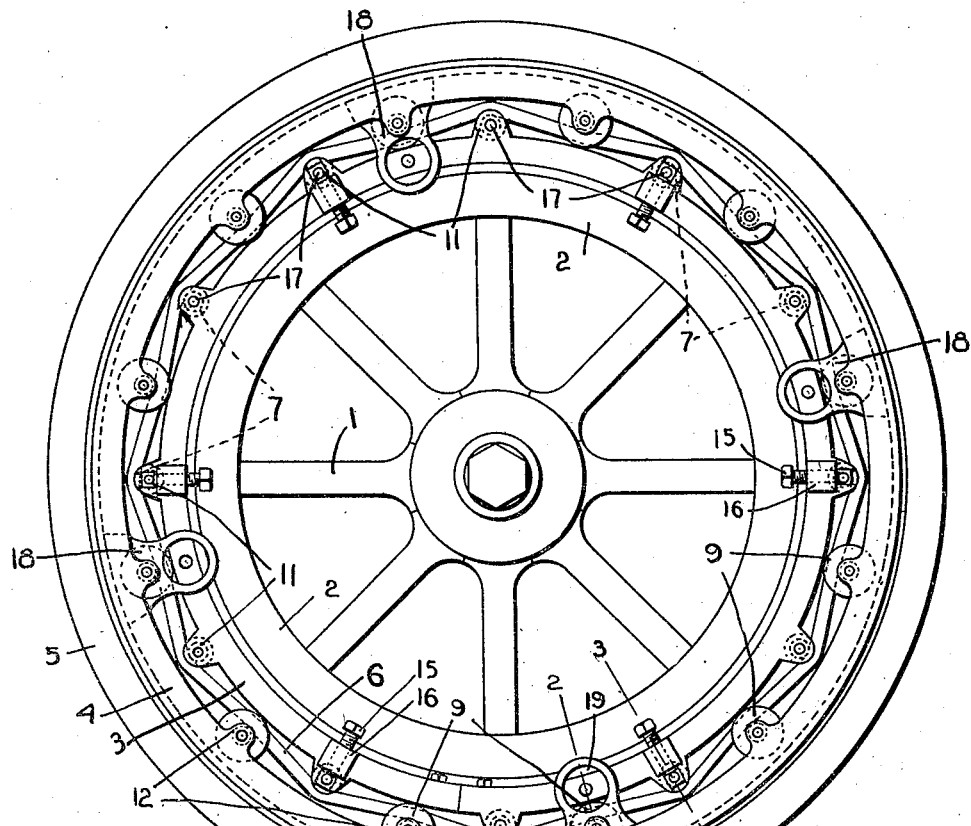
Figure 1 is a side view of a wheel embodying my invention.

My improved wheel comprises a wheel body and an exterior rim separate from the body and surrounding the latter, and a plurality of flexible cords interposed between said wheel body and rim and constructed to form a flexible or yielding connection between these parts. The wheel body is shown at 1 and it may have any suitable or usual construction. It is herein shown as provided with a felly portion 2 on the exterior of which is a metal band 3 that I will hereinafter refer to as the inner rim. Surrounding this metal band 3 is another rim member 4, which for convenience I will refer to as the outer rim. This rim member is constructed to receive a tread member 5 which may be in the form of a pneumatic tire or solid tire as desired. The operative connection between the inner rim 3 and the outer rim 4 is in the form of one or more flexible cords or cables 6. I will prefer to use wire cords or cable for this purpose, but any flexible cable would answer.

The inner rim 3 is provided on its exterior with a plurality of bearing rolls 7 having grooves 8 to receive the cord 6 and the outer rim 4 is provided on its inner face with a plurality of rolls 9 also having grooves 10 therein to receive the cords or cables 6. The cords or cables 6 pass on the outside of the rolls 7 and on the inside of the rolls 9, and said rolls have such relation to each other that these cords are compelled to take more or less of a sinuous course, as shown in Fig. 1. The rolls 7 carried by the inner rim are journaled in bearings 11 formed on the inner rim and the rolls 9 carried by the outer rim are journaled in bearings 12 carried by said rim. Means are provided for tightening the cords or cables 6 if they become slack through stretching. This is herein accomplished by providing means for adjusting some of the rolls 7 in their bearing. I have herein shown the bearing for every alternate roll 7 as provided with adjusting screws 15 which are screw-threaded through bosses 16 formed on said inner rim and which engage the shaft 17 for the rolls 7. The bearings in which these adjustable rolls are mounted are slotted so as to allow for radial movement of the shaft 17, and by manipulating the adjusting screws 15, the corresponding rolls can be forced outwardly thereby taking up any slack in the cords or cables 6 and keeping them under proper tension. The outer rim 4 is provided at intervals with inwardly-extending guide projections 18 which overlie the inner rim and prevent any lateral movement of the rims relative to each other.

Figure 2:
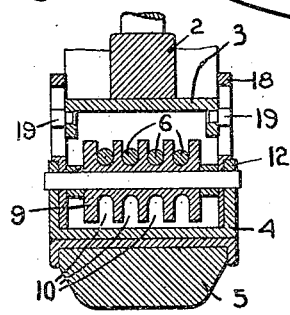
Fig. 2 is a section on the line 2—2, Fig. 1.
Figure 3:
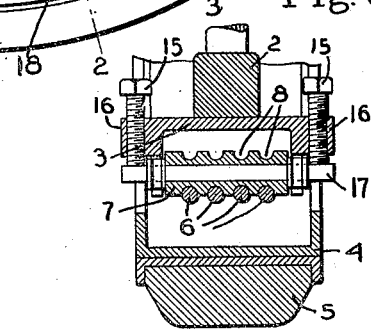
Fig. 3 is a section on the line 3—3, Fig. 1.

These guide projections 18 are shown in the form of plates which are situated inside of the side flanges of the U-shaped outer rim 4 and which project inwardly beyond said rim. The outer edges of these plates are shaped to fit the body of the rim 4, and the plates are held in place by the spindles on which certain of the rolls 9 are mounted, as clearly seen in Figs. 1 and 2. The portion of the plates 18 which extend inwardly from the outer rim are provided with openings, and the openings receive pins 19 extending laterally from the outer face of the inner rim 3, as shown clearly in Figs. 1 and 2. The guide projections 18 thus serve not only to prevent any lateral movement of the rims relative to each other, but they also coöperate with the pins or projections 19 to prevent any creeping movement of the outer rim relative to the wheel body.

The cords 6 provide a flexible yielding connection between the outer rim and the wheel body and thus as the wheel rolls along in use, the load will be yieldingly supported.

I claim:

In a wheel, the combination with a wheel body having a rim portion provided with bearings, some at least of which are slotted, of rolls journaled in said bearings, the slotted bearings having bosses associated therewith, adjusting screws screw-threaded through said bosses and by which the rolls in the slotted bearings may be adjusted radially, an outer rim encircling the wheel body, a plurality of rolls carried on the inner face thereof, and flexible cords extending over the rolls on the wheel body and under the rolls on the outer rim.

In testimony whereof I have signed my name to this specification.

ALFONSO D'ERRICO.